J. BLACKBURN.
LOCK FOR AUTOMOBILE STEERING DEVICES.
APPLICATION FILED FEB. 3, 1919.
1,343,192.
Patented June 15, 1920.
2 SHEETS—SHEET 2.
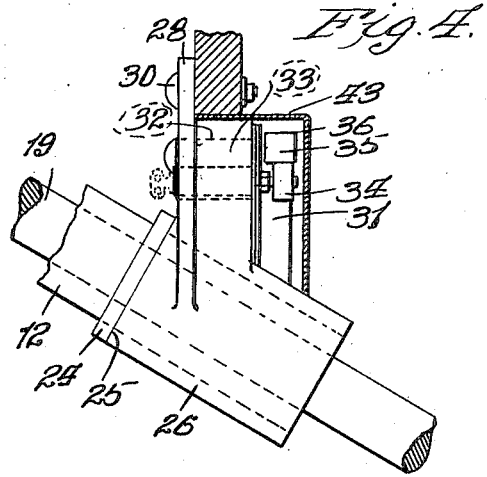
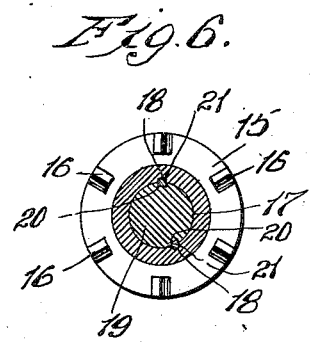
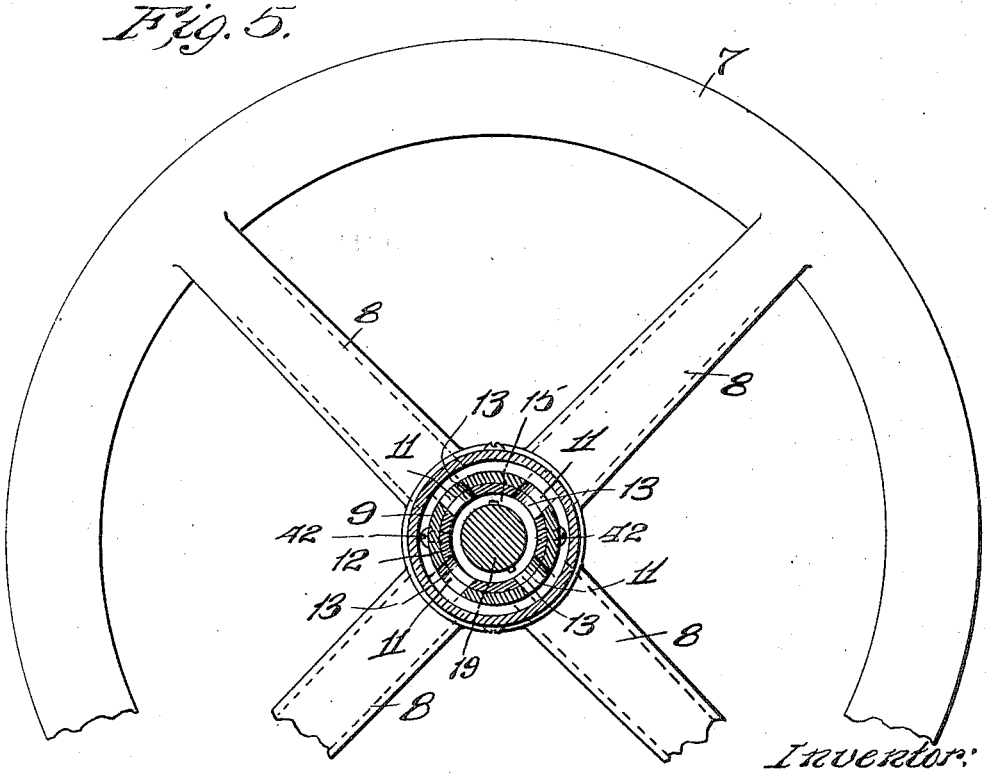
Inventor:
Jasper Blackburn.
By Edward E Longan
atty.

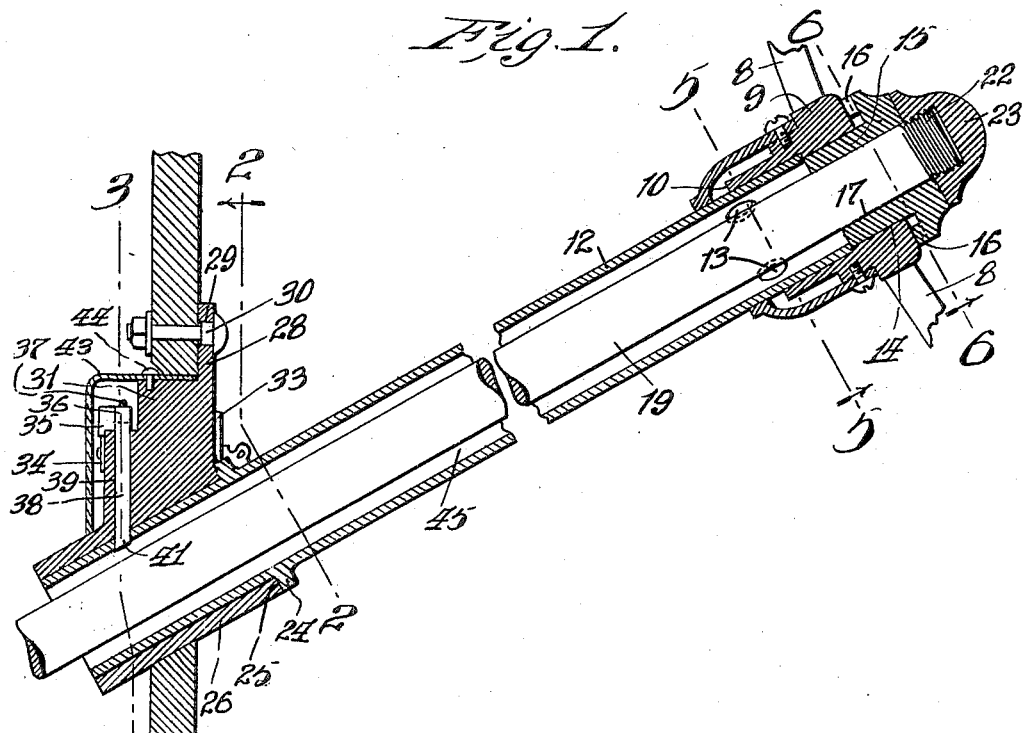

UNITED STATES PATENT OFFICE.

JASPER BLACKBURN, OF WEBSTER GROVES, MISSOURI, ASSIGNOR TO THE BLACKBURN PATENT STEERING WHEEL COMPANY, OF ST. LOUIS, MISSOURI, A CORPORATION OF MISSOURI.

LOCK FOR AUTOMOBILE-STEERING DEVICES.

1,343,192.

Specification of Letters Patent. Patented June 15, 1920.

Application filed February 3, 1919. Serial No. 274,605.

*To all whom it may concern:*

Be it known that I, JASPER BLACKBURN, a citizen of the United States, and resident of Webster Groves, St. Louis county, Missouri, have invented certain new and useful Improvements in Locks for Automobile-Steering Devices, of which the following is a specification containing a full, clear, and exact description, reference being had to the accompanying drawings, forming a part thereof.

My invention relates to certain new and useful improvements in locks for automobile steering devices and has for its primary object a lock whereby the steering mechanism of an automobile is secured against rotation by means of a key operated mechanism. A further object is to provide a lock for automobile steering devices wherein the lock is located within the car and near the base of the steering device.

In the drawings:

Figure 1 is a longitudinal sectional view of my device showing the same attached to the steering mechanism of an automobile, the non-essential parts being broken away.

Fig. 2 is a cross-sectional view taken on the line 2—2 of Fig. 1.

Fig. 3 is a cross-sectional view taken on the line 3—3 of Fig. 1.

Fig. 4 is a sectional view taken on the line 4—4 of Fig. 3.

Fig. 5 is a cross-sectional view taken on the line 5—5 of Fig. 1.

Fig. 6 is a cross-sectional view taken on the line 6—6 of Fig. 1.

In the drawings, 7 indicates the ordinary automobile steering wheel which is provided preferably with hollow spokes 8 and a hub 9. This hub is provided at its bottom end 10 with a plurality of slotted openings 11. Within the hub 9 is located a steering column 12 which extends only partially into the hub and this column is provided with openings 13 which register with the openings 11 formed in the hub of the steering wheel. The hub 9 is further provided with a bore 14 into which an adapting sleeve 15 is seated, the hub 9 and adapting sleeve 15 being provided with teeth and recesses 16, so that the adapting sleeve may be held against rotation within hub.

The adapting sleeve is further provided on its inner surface with a bore 17 and key-ways 18. In the bore 17, the steering post 19 is located, this steering post being provided with key-ways 20, so that when the keys 21 are inserted into the key-ways 18 and 20, the adapting sleeve is securely locked against rotation on the steering post. In order to prevent the lifting of the wheel 7, the upper end of the steering post 19 is screw threaded as indicated by the numeral 22 and over this, a nut 23 is secured, thus binding the steering wheel, adapting sleeve and steering post securely together.

Near its lower end, the steering column 12 is provided with an integral flange 24 which rests against the face 25 of a sleeve 26. This sleeve 26 is provided with a fan-shaped flange or projection 28, by means of which the same is secured to the instrument board or the foot board of an automobile. The flange 28 is provided with a plurality of openings 29 for the admission of carriage bolts 30, the purpose of which are for securing the device to an automobile. The sleeve 26 is further provided with a projection or lug 31 in which the locking mechanism is located. This lug 31 is provided with a bore 32 which is adapted to receive the barrel 33 of an ordinary lock. To the rear end of the barrel 33 is attached a lever 34 which is constructed of any suitable material, the shape being clearly shown in Fig. 3.

The lever 34 contacts with the arm 35 formed integrally with the locking bolt 36. This locking bolt is preferably L-shaped and is actuated by means of a spring 37. One part of the bolt 36, which is indicated by the numeral 38, is inserted in an opening 39 formed in the lug 31 and extends entirely therethrough and into the steering column 12. This steering column 12 is provided with a plurality of openings 40, so that when the steering column is turned the wheels of the automobile may be locked in turned position so that the machine will run into the curbing when an attempt is made to make unauthorized use of the machine.

The lock made use of is preferably of the pin type which is fully shown in Fig. 2 and which may be purchased in the open market and therefore the details of this lock are not shown or described as it is a well known commercial article.

In the preferred type of construction, the steering column 12 is secured to rotate with the wheel and the steering post 19, and is rigidly secured to the hub 9 by means of screws 42 which pass through the hub and into the steering column, see Fig. 5. In the preferred type of construction as illustrated, that is, where the steering column 12 is made to rotate with the wheel and steering post, a space 45 is provided for the various conducting wires and when the steering mechanism is operated there is no twisting of said conductors. By employing a rotating steering column surrounding the steering post and attaching the wheel to both the steering column and post, a more substantial steering mechanism is obtained, as the sleeve 26 may be of any desired length so as to give rigidity to the steering column and post, and by this construction, the danger of springing the steering post is minimized.

It is preferable to construct the rotating steering column of cast metal and turning same, so as to give a true bearing in the sleeve 26. I may, however, if desired, form this steering column out of tubing and shrink the collar 24 on the tubing at any desired point. By providing a rotating steering column 12 with a shoulder 24, it will be impossible to insert any tool into the sleeve for manipulating or destroying the lock.

Surrounding the rear of the lock mechanism and the lug 31, I provide a housing 43 which is secured to the sleeve member 26 by means of screws 44, the object of this housing being to protect the bolt and the rear of the lock to prevent the same of being manipulated from the rear.

Having fully described my invention, what I claim is:

1. A lock for automobile steering devices comprising in combination with a steering mechanism of an automobile, of a rotatable steering post, a rotatable steering column, a socket support for said steering column, a steering wheel mounted on said steering post and connected to the same and the steering column, a lock provided with a locking bolt mounted in the socket adjacent the lower end of the steering column, said locking bolt adapted to engage in openings formed on the steering column, a key for operating said locking bolt and a detachable housing for inclosing said bolt.

2. A lock for automobile steering devices comprising a steering post, an adapting sleeve secured thereto, a steering wheel secured to the adapting sleeve, a rotating steering column secured to the wheel, a socket support for said steering column, means for attaching said socket support to the body of an automobile, a locking bolt mounted in the steering column support and adapted to be inserted in openings formed in the steering column for locking the steering post against rotation, a key for unlocking the locking bolt, and resilient means for holding the locking bolt in engagement with the steering column.

3. A lock for automobile steering devices comprising a steering post, an adapting sleeve secured to the steering post, a steering wheel secured to said adapting sleeve, a steering column secured to said rotating steering wheel, a supporting socket for said steering column, a flange formed integral with the supporting socket for attaching the same to an automobile, an L-shaped locking bolt spring pressed in one direction mounted in the support for the steering column, a lock having a barrel mounted in said support, and a lever secured to said barrel for operating the locking bolt and a key for operating said barrel and a housing for inclosing said locking bolt.

4. A lock for automobile steering devices comprising a steering post, an adapting sleeve keyed to said post, a steering wheel mounted on said adapting sleeve, a nut for securing said sleeve and wheel together, a steering column secured to said rotating steering wheel, a supporting socket for said steering column, a flange formed integral with the supporting socket for attaching the same to an automobile, a flange carried by said steering column and contacting with the top edge of the supporting socket, an L-shaped locking bolt spring pressed in one direction mounted in the support for the steering column, a lock having a barrel mounted in said support, a lever secured to said barrel for operating the locking bolt and a key for operating said barrel and a removable housing for inclosing the locking bolt and lever.

In testimony whereof I have signed my name to this specification in presence of two subscribing witnesses.

JASPER BLACKBURN.

Witnesses:
ELIZABETH CURTALL,
WALTER C. STEIN.